(12) United States Patent
O'Connell et al.

(10) Patent No.: US 9,817,963 B2
(45) Date of Patent: Nov. 14, 2017

(54) USER-TOUCHSCREEN INTERACTION ANALYSIS AUTHENTICATION SYSTEM

(75) Inventors: Brian M. O'Connell, Research Traingle Park, NC (US); Keith R. Walker, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1193 days.

(21) Appl. No.: 13/293,356

(22) Filed: Nov. 10, 2011

(65) Prior Publication Data
US 2012/0054057 A1 Mar. 1, 2012

Related U.S. Application Data

(63) Continuation-in-part of application No. 12/126,117, filed on May 23, 2008, now Pat. No. 8,918,479.
(Continued)

(51) Int. Cl.
*G06F 21/36* (2013.01)
*G06F 21/55* (2013.01)
*G06Q 30/06* (2012.01)

(52) U.S. Cl.
CPC .............. *G06F 21/36* (2013.01); *G06F 21/55* (2013.01); *G06Q 30/0601* (2013.01)

(58) Field of Classification Search
CPC ...... G06F 21/36; G06F 21/55; G06Q 30/0601
See application file for complete search history.

(56) References Cited

U.S. PATENT DOCUMENTS

| 4,959,810 A | 9/1990 | Darbee et al. |
| 5,640,002 A * | 6/1997 | Ruppert .............. G06K 7/0008 235/383 |

(Continued)

FOREIGN PATENT DOCUMENTS

| GB | 2456864 A | 7/2009 |
| WO | 02082214 A2 | 10/2002 |
| WO | WO02082214 A2 | 10/2002 |

OTHER PUBLICATIONS

Sergio Tenreiro de Magalhaes, Kenneth Revett and Henrique M.D. Santos, Password Secured Sites-Stepping Forward with Keystrokes Dynamics, Aug. 22-26, 2005, IEEE Computer Society, pp. 1-6.
(Continued)

*Primary Examiner* — Patrice Winder
*Assistant Examiner* — Angela Widhalm De Rodri
(74) *Attorney, Agent, or Firm* — Brown & Michaels, PC; Issac Gooshaw (57) ABSTRACT

A user participating in an e-commerce session can be authenticated based on user-touchscreen interaction analysis. That is, a user requested action can be determined that requires additional authentication. Such authentication can further include, requesting analysis of user-touchscreen interaction for the e-commerce session and receiving a pattern matching score for the session from a computer. The pattern matching score can provide an indication of a comparison between the user's interaction with a touchscreen during the session and a pre-established user-touchscreen interaction profile for the user. A computer can perform a verification action to verify an identity of the user based on the received pattern matching score. Responsive to a successful verification of the identity, the computer can perform the requested action.

20 Claims, 5 Drawing Sheets

Related U.S. Application Data which is a continuation-in-part of application No. 11/279,186, filed on Apr. 10, 2006, now abandoned.

(56) References Cited

U.S. PATENT DOCUMENTS

| | | | |
|---|---|---|---|
| 5,821,871 A * | 10/1998 | Benzler | 340/5.8 |
| 5,991,735 A * | 11/1999 | Gerace | 705/7.33 |
| 6,028,950 A | 2/2000 | Merjanian | |
| 6,148,094 A | 11/2000 | Kinsella | |
| 6,163,616 A * | 12/2000 | Feldman | 382/115 |
| 6,182,076 B1 | 1/2001 | Yu et al. | |
| 6,304,915 B1 | 10/2001 | Nguyen et al. | |
| 6,510,415 B1 | 1/2003 | Talmor et al. | |
| 6,612,928 B1 * | 9/2003 | Bradford | G06F 21/31 463/29 |
| 6,668,322 B1 * | 12/2003 | Wood | G06F 21/41 713/182 |
| 6,668,327 B1 | 12/2003 | Prabandham et al. | |
| 6,813,718 B2 | 11/2004 | Colvin | |
| 6,904,408 B1 | 6/2005 | McMarthy et al. | |
| 6,941,340 B2 | 9/2005 | Kim et al. | |
| 6,944,773 B1 * | 9/2005 | Abrahams | G06F 21/32 709/229 |
| 7,360,239 B2 * | 4/2008 | Mandalia et al. | 726/5 |
| 7,383,570 B2 | 6/2008 | Pinkas et al. | |
| 7,552,199 B2 | 6/2009 | Pomerantz | |
| 7,613,659 B1 | 11/2009 | Hoffman et al. | |
| 7,613,685 B2 | 11/2009 | Jaepel et al. | |
| 7,693,863 B2 | 4/2010 | Martin et al. | |
| 7,813,822 B1 | 10/2010 | Hoffberg | |
| 7,831,490 B2 * | 11/2010 | Modigliani | G06Q 20/02 705/35 |
| 7,873,595 B2 | 1/2011 | Singh et al. | |
| 7,907,531 B2 * | 3/2011 | Jha et al. | 370/241 |
| 7,975,025 B1 | 7/2011 | Szabo et al. | |
| 8,032,483 B1 | 10/2011 | Haveliwala et al. | |
| 8,751,801 B2 * | 6/2014 | Harris et al. | 713/168 |
| 2001/0036254 A1 | 11/2001 | Davis et al. | |
| 2001/0042045 A1 | 11/2001 | Howard et al. | |
| 2002/0023059 A1 * | 2/2002 | Bari | G06F 21/41 705/76 |
| 2002/0065912 A1 | 5/2002 | Catchpole et al. | |
| 2002/0099649 A1 | 7/2002 | Lee | |
| 2002/0112048 A1 | 8/2002 | Gruyer et al. | |
| 2002/0178257 A1 | 11/2002 | Cerrato | |
| 2003/0023549 A1 * | 1/2003 | Armes | G06Q 20/02 705/40 |
| 2003/0055738 A1 | 3/2003 | Alie | |
| 2003/0105710 A1 | 6/2003 | Barbara et al. | |
| 2003/0140230 A1 * | 7/2003 | de Jong | H04L 63/0407 713/182 |
| 2003/0159070 A1 | 8/2003 | Mayer et al. | |
| 2004/0015714 A1 | 1/2004 | Abraham et al. | |
| 2004/0034794 A1 | 2/2004 | Mayer et al. | |
| 2004/0230495 A1 | 11/2004 | Lotvin et al. | |
| 2004/0250115 A1 | 12/2004 | Gemmel et al. | |
| 2005/0008148 A1 | 1/2005 | Jacobson et al. | |
| 2005/0050366 A1 | 3/2005 | Kwok et al. | |
| 2005/0154676 A1 | 7/2005 | Ronning et al. | |
| 2006/0048178 A1 | 3/2006 | Kortum et al. | |
| 2006/0156385 A1 * | 7/2006 | Chiviendacz et al. | 726/2 |
| 2006/0212407 A1 | 9/2006 | Lyon | |
| 2006/0282660 A1 | 12/2006 | Varghese et al. | |
| 2006/0287963 A1 | 12/2006 | Steeves | |
| 2007/0023672 A1 | 2/2007 | Sellmair | |
| 2007/0050262 A1 * | 3/2007 | Van Breemen et al. | 705/26 |
| 2007/0073579 A1 | 3/2007 | Immorlica et al. | |
| 2007/0108269 A1 * | 5/2007 | Benco | G06Q 20/12 235/380 |
| 2007/0180485 A1 | 8/2007 | Dua | |
| 2007/0206741 A1 | 9/2007 | Tiliks et al. | |
| 2007/0239604 A1 | 10/2007 | O'Connell | |
| 2007/0240230 A1 | 10/2007 | O'Connell | |
| 2007/0245157 A1 * | 10/2007 | Giobbi et al. | 713/186 |
| 2008/0306782 A1 * | 12/2008 | Ephrati | 705/7 |
| 2011/0082763 A1 | 4/2011 | Leite et al. | |
| 2012/0540057 | 3/2012 | Manning | |
| 2012/0198489 A1 | 8/2012 | O'Connell | |
| 2012/0198491 A1 | 8/2012 | O'Connell | |
| 2012/0204257 A1 | 8/2012 | O'Connell | |
| 2013/0030936 A1 | 1/2013 | Aidasani | |
| 2013/0036458 A1 * | 2/2013 | Liberman et al. | 726/6 |
| 2013/0254139 A1 | 9/2013 | Lei | |
| 2013/0282580 A1 * | 10/2013 | O'Brien | G06Q 20/4014 705/44 |
| 2014/0019542 A1 | 1/2014 | Rao et al. | |
| 2014/0164178 A1 | 6/2014 | Adjaote | |

OTHER PUBLICATIONS globalsecurity.org, "Biometrics: Hand Geometry and Handwriting," http://www.globalsecurity.org/security/systems/hand.htm, Apr. 27, 2005, pp. 3.

Tsan-Yu J. Huang, Final Office Action; mail date Jul. 7, 2009; published by the USPTO in utility U.S. Appl. No. 11/279,202, pp. 15.

Tsan-Yu J. Huang, Non-Final Office Action; mail date Jul. 23, 2009; published by the USPTO in utility U.S. Appl. No. 11/279,202, pp. 14.

Yanet Rodriguez, Non-Final Office Action; mail date Apr. 14, 2009; published by the USPTO in utility U.S. Appl. No. 11/279,186, pp. 21.

S.J.Shepherd, "Continuous Authentication by Analysis of Keyboard Typing Characteristics,"European Convention of Security & Detection, May 16-18, 1995, Conference Pub No. 408 copyright IEE 1995, pp. 111-114.

International Search Report; International App No. PCT/EP2007/051950, mail date: Nov. 7, 2007; pp. 2.

Yanet Rodriguez, U.S. Appl. No. 11/279,186.

Tsan-Yu J-Huang, U.S. Appl. No. 11/279,202.

"Enabling Data Exchange in Ajax Applications", by Andrei Cioroianu, published by Oracle Technology Network in 2006.

The AJAX effect on Server Load:, by Kirk Pepperdine, published by TheServerSide.com in 2005.

File wrapper for U.S. Appl. No. 11/279,202; dated Apr. 2017.
File wrapper for U.S. Appl No. 11/279,186; dated Apr. 2017.
File wrapper for U.S. Appl. No. 13/447,848; dated Apr. 2017.
File wrapper for U.S. Appl. No. 13/444,465; dated Apr. 2017.
File wrapper for U.S. Appl. No. 13/444,947; dated Apr. 2017.
File wrapper for U.S. Appl. No. 12/126,117; dated Apr. 2017.

* cited by examiner

USER-TOUCHSCREEN INTERACTION ANALYSIS AUTHENTICATION SYSTEM

CROSS-REFERENCES TO RELATED APPLICATIONS

Pursuant to 35 USC §120, this continuation-in-part application of U.S. patent application Ser. No. 12/126,117 filed May 23, 2008 (pending), which claims the benefit of U.S. patent application Ser. No. 11/279,186 filed on Apr. 10, 2006 (abandoned).

TECHNICAL FIELD

The present invention relates to the field of data processing systems and, in particular, to systems, methods and computer program products for authenticating a user based on analysis of user-touchscreen interaction.

BACKGROUND

Touchscreen devices (e.g., smartphones, tablets, and the like) have become staples in modern everyday life. Users wish to utilize these devices for some or all of the same tasks they have become accustomed to expect from personal computers. As such, users may wish to engage in browsing activities or launching applications designed for online activity, such as banking, shopping, communicating via e-mail, and the like. In fact, users often engage in e-commerce transactions on their touchscreen devices.

One caveat to these e-commerce transactions can be that oftentimes security problems arise, leaving user financial accounts vulnerable to theft and/or fraud. These threats are universal to e-commerce transactions, but are especially troublesome on touchscreen devices that often have dedicated applications (or "apps") for e-commerce sites or services. For example, a user may have a banking app as well as a discount or deal app (e.g., a GROUPON app, GOOGLE Deals app, etc.) easily accessible on his or her touchscreen device that can be directly tied to his or her payment information (e.g., saved credit or bank card information, PAYPAL account information, etc.).

E-commerce apps can leave a user's accounts vulnerable to theft or fraud. Hackers can hack into accounts by many methods, including phishing (fraudulently acquiring account information by pretending to be a trustworthy source), spyware, insider information, compromised data sources at the commerce location, or other methodologies. Many solutions have been developed attempting to prevent e-commerce fraud. For example, one method designed with the intent of preventing e-commerce fraud (i.e., user authentication), can require a user ID and password to complete a transaction using an e-commerce app. Another known solution is to require a security code (a three or four digit non-imprinted number on a credit card, a user set PIN number, and/or billing zip code, etc.) along with every on-line purchase using an e-commerce app in addition to password authentication. Another known solution is to also require operator "call back" to authenticate a purchaser using an e-commerce app. Yet another known solution is to require the user to fully validate or re-enter his or her credentials with every e-commerce transaction performed using an e-commerce app.

SUMMARY

In at least one embodiment, there is a method for authenticating a user participating in an Internet commerce session. The method includes a computer receiving a request for an action from a remotely located device connected to the computer via an Internet Protocol (IP) network. The computer facilitates an e-commerce session in which a user of the remotely located device participates. The method further includes the computer determining whether the requested action requires additional authentication. The method further includes, in response to determining that the requested action requires additional authentication, the computer requesting analysis of user-touchscreen interaction data for the e-commerce session. The user-touchscreen interaction data is behavioral biometric data specific to a characteristic manner in which the user touches a touchscreen. The method further includes the computer receiving a pattern matching score for the session. The pattern matching score provides an indication of a comparison between the user-touchscreen interaction data and corresponding data of a user-touchscreen interaction profile for the user. The method further includes the computer performing a verification action to verify an identity of the user based on the received pattern matching score. The method further includes, responsive to a successfully verification of the identity, the computer performing the requested action.

In at least one embodiment, there is a computer program product for authenticating a user participating in an Internet commerce session. The computer program product includes one or more computer-readable tangible storage devices. The computer program product further includes program instructions, stored on at least one of the one or more storage devices, to receive a request for an action from a remotely located device connected to a computer via an Internet Protocol (IP) network. The computer facilitates an e-commerce session in which a user of the remotely located device participates. The computer program product further includes program instructions, stored on at least one of the one or more storage devices, to determine whether the requested action requires additional authentication. The computer program product further includes program instructions, stored on at least one of the one or more storage devices, to, in response to determining that the requested action requires additional authentication, request analysis of user-touchscreen interaction data for the e-commerce session. The user-touchscreen interaction data is behavioral biometric data specific to a characteristic matter in which the user touches a touchscreen. The computer program product further includes program instructions, stored on at least one of the one or more storage devices, to receive a pattern matching score for the session. The pattern matching score provides an indication of a comparison between the user-touchscreen interaction data and corresponding data of a user-touchscreen interaction profile for the user. The computer program product further includes program instructions, stored on at least one of the one or more storage devices, to perform a verification action to verify an identity of the user based on the received pattern matching score. The computer program product further includes program instructions, stored on at least one of the one or more storage devices, to, responsive to a successful verification of the identity, perform the requested action.

In at least one embodiment, there is a computer system for authenticating a user participating in an Internet commerce session. The computer system includes one or more processors, one or more computer-readable memories and one or more computer-readable tangible storage devices. The computer system further includes program instructions, stored on at least one of the one or more storage devices for execution by at least one of the one or more processors via at least one of the one or more memories, to receive a request for an action from a remotely located device connected to a computer via an Internet Protocol (IP) network. The computer facilitates an e-commerce session in which a user of the remotely located device participates. The computer system further includes program instructions, stored on at least one of the one or more storage devices for execution by at least one of the one or more processors via at least one of the one or more memories, to determine whether the requested action requires additional authentication. The computer system further includes program instructions, stored on at least one of the one or more storage devices for execution by at least one of the one or more processors via at least one of the one or more memories, to, in response to determining that the requested action requires additional authentication, request analysis of user-touchscreen interaction data for the e-commerce session. The user-touchscreen interaction data is behavioral biometric data specific to a characteristic matter in which the user touches a touchscreen. The computer system further includes program instructions, stored on at least one of the one or more storage devices for execution by at least one of the one or more processors via at least one of the one or more memories, to receive a pattern matching score for the session. The pattern matching score provides an indication of a comparison between the user-touchscreen interaction data and corresponding data of a user-touchscreen interaction profile for the user. The computer system further includes program instructions, stored on at least one of the one or more storage devices for execution by at least one of the one or more processors via at least one of the one or more memories, to perform a verification action to verify an identity of the user based on the received pattern matching score. The computer system further includes program instructions, stored on at least one of the one or more storage devices for execution by at least one of the one or more processors via at least one of the one or more memories, to, responsive to a successful verification of the identity, perform the requested action.

DETAILED DESCRIPTION

Embodiments of the present invention recognize that many solutions have been developed attempting to prevent e-commerce fraud, but have, to date, failed to provide an effective and efficient solution. For example, requiring a user ID and password (i.e., user authentication) to complete a transaction using an e-commerce app, by itself, is subject to hacking by the means described previously. Further, requiring a security code (a three or four digit non-imprinted number on a credit card, a user set PIN number, and/or billing zip code, etc.) along with every on-line purchase using an e-commerce app in addition to password authentication provides no protection for phishing, as the code will typically be entered during the phishing process along with other account information. Requiring operator "call back" to authenticate the purchaser is inadequate because phone numbers can be quickly setup and taken down with no audit trail with Voice over Internet Protocol (VoIP) accounts. Moreover, this solution significantly increases the expense to businesses as it requires a live person to make phone calls. Requiring the user to fully validate or re-enter his or her credentials with every e-commerce transaction performed using an e-commerce app places an added burden on the consumer and can thus significantly lower customer satisfaction.

Embodiments of the present invention provide an effective solution for user authentication on touchscreen devices. In particular, one embodiment can also operate "behind the scenes" (i.e., without the touchscreen device user being actively aware of it), to provide a seamless and efficient authentication system. In such a manner, embodiments of the present invention can allow tracking of a user's interaction with a touchscreen over multiple sessions to generate patterns in a user profile, and subsequently compare a user's actions in a new session with the previously established patterns to provide a type of authentication.

The user-touchscreen interaction authentication can, in one embodiment, in a two-factor authentication system, serve as a supplement to another type of authentication (a secondary form of authentication), such as a user name and password. In some other embodiments, with sufficiently robust and sophisticated interaction data, user-touchscreen interaction authentication can also serve as a sole form of authentication. Through the use of user-touchscreen interaction profiles, different interaction styles of the users on different touchscreens may advantageously be accommodated. This can be attributed to the fact that users tend to interact with the same hardware in a similar fashion when completing similar tasks.

For example, a single user may interact differently with a touchscreen on his or her smartphone device than a touchscreen on his or her tablet device, which is usually larger in screen size. The difference can be due to not only physically differing hardware and as such device configurations, but also different application or app presentation of content across varying devices. The user may typically hold the device in his or her right hand and, simultaneously, browse with his or her right hand's thumb in landscape mode on a smartphone. The same user can prefer to hold his or her tablet device with the left hand and leave it in portrait mode for general browsing with his or her right hand's fingers.

Thus, two distinct user profiles of interaction patterns (specific to the touchscreen device utilized) can be compiled into a profile for a single user.

The disclosed user-touchscreen interaction authentication can be particularly useful for e-commerce applications accessible via smartphone and tablet touchscreens where user convenience is highly valued and fraud is a significant risk. It should be noted that the method, system and computer program product embodiments disclosed herein are not to be construed as limited to e-commerce applications. Rather, they can be extended to a broad range of applications or apps. Examples of such extensions include, but are not limited to, protecting banking patrons who accidentally do not log out of their account or protecting social network patrons who let a friend borrow their touchscreen device and who then begin uploading or posting inappropriate information.

In one embodiment, a touchscreen device can include a JAVASCRIPT enabled web browser client that supports asynchronous JAVASCRIPT (AJAX) or Extensible Markup Language Hyper Hypertext Transfer Protocol (XMLHTTP) as most main stream browsers readily support such technology (Internet Explorer® and Firefox® included) (Internet Explorer® is a registered trademark of Microsoft Corporation in the United States and Firefox® is a registered trademark of Mozilla Foundation in the United States). The e-commerce app being accessed by the touchscreen device can reside on a server computer that includes an application server (e.g., WEBSPHERE®) application or a custom written socket listener that can be capable of processing multiple simultaneous inbound requests (WEBSPHERE® is a registered trademark of International Business Machines Corporation in the United States). In another embodiment, or in addition to the JAVASCRIPT enabled embodiment, a plug-in to an existing e-commerce client app could be installed on the touchscreen device to send information that is useful (but that cannot be detected with JAVASCRIPT) to the e-commerce app on the server computer.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium (also referable to as a storage device) may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
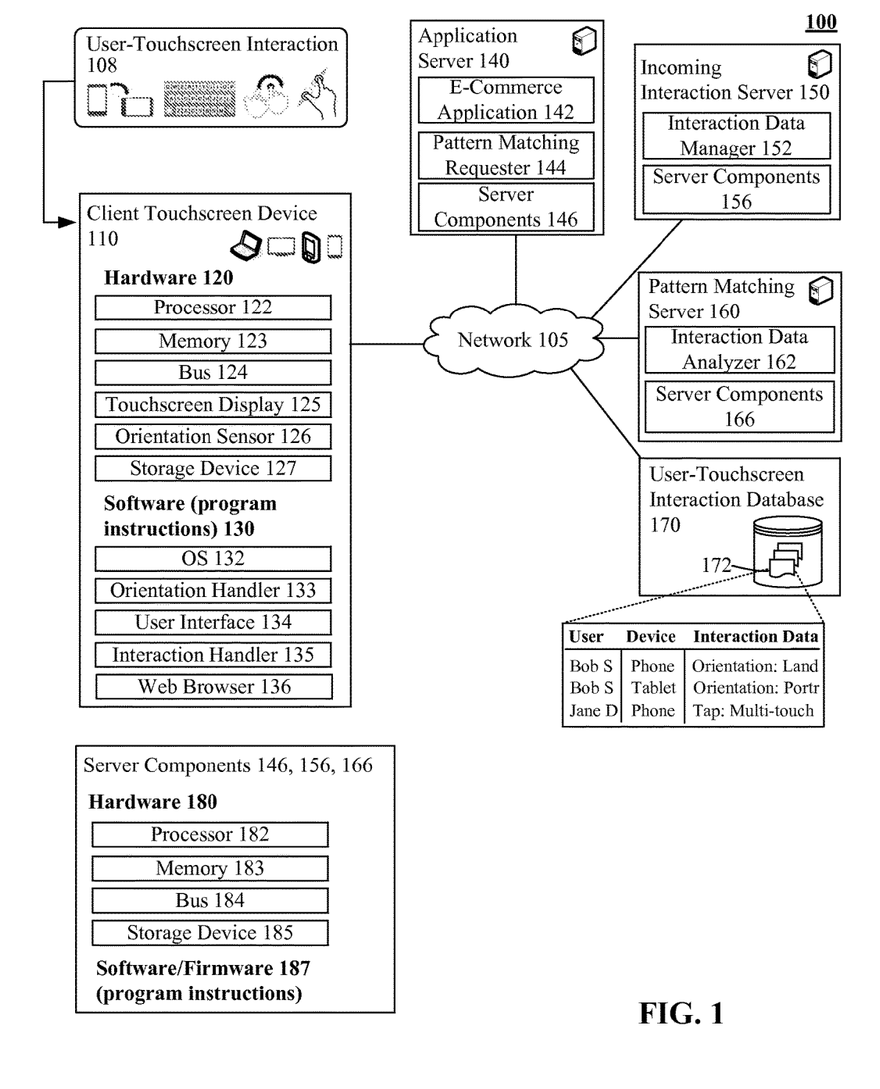
FIG. 1 is a schematic diagram illustrating a system for e-commerce transaction user authentication using user-touchscreen interaction analysis in accordance with embodiments of the inventive arrangements disclosed herein.

FIG. 1 is a schematic diagram illustrating a system 100 for e-commerce transaction user authentication using user-touchscreen interaction analysis in accordance with embodiments of the inventive arrangements disclosed herein. In one embodiment, a user can manipulate content on his or her touchscreen display equipped device 110 via user-touchscreen interactions 108. User-touchscreen interactions 108 can take the place of conventional input (i.e., external hardware facilitated keyboard or mouse input). User-touchscreen interactions 108 can be unique to a user and thus serve to positively identify a user based on a comparison with previously recorded user-touchscreen interaction patterns of the user. In one embodiment, in addition to user-specific touchscreen interaction data, information identifying device 110 can be used to identify device 110.

User-touchscreen interaction patterns can be utilized to authenticate the user in an e-commerce session. The user, interacting with client touchscreen device 110, can request an action associated with an e-commerce application 142. Should additional authentication be necessary for the user requested action, user touchscreen interaction data for the e-commerce session can be compared against an existing user-specific profile, which can be maintained in user-touchscreen interaction database 170. An application server 140 (which can include e-commerce application 142 and a pattern matching requester 144) can interact with an incoming interaction server 150 (which can include an interaction data manager 152), a pattern matching server 160 (which can include an interaction data analyzer 162), and the user-touchscreen interaction database 170 (which can include records 172 of unique user-touchscreen interaction patterns in user profiles). In order to authenticate a user via user-touchscreen interaction data, system 100 can engage in analysis of user-touchscreen interactions for the session and establish a pattern matching score for the user-touchscreen interactions.

The pattern matching score can provide an indication of a comparison between the user-touchscreen interaction data indicative of the user's interaction with a touchscreen during the session and a data in a pre-established user-touchscreen interaction profile for the user. Based on the pattern matching score, a specific action can be performed. The specific action can be, for example, the requested action (e.g., completing an e-commerce transaction, accessing restricted information, modifying user information, changing a password for the user, requesting additional information), or denying the requested action.

User-touchscreen interactions 108 with touchscreen device 110 can be considered a behavioral biometric used for user authentication. Behavioral patterns unique to a user can include, but are not limited to, screen orientation, typing rate and style, zooming methods, scrolling methods, hand preference, an area of a screen typical of a user's touch (i.e., finger sizes, portions pressed on a screen different from person-to-person), an average pressure asserted per touch, a space exerted between touch-points of a multi-touch interaction, a speed of movement for continuous touch actions on a touch-screen, a speed at which concurrent touches occur, an orientation of a hand-held touchscreen device in use, movements (e.g., shaking, steady, etc.) of a touchscreen device during use, extraneous touches—or lack thereof during use of a touchscreen device, and other discernible idiosyncrasies for touch-based interactions.

User-touchscreen interaction data can be provided to the analyzing server (e.g., server 160) in numerous contemplated ways depending on implementation details. In one embodiment, e-commerce application 142 can include JAVASCRIPT or other code that captures user-touchscreen interaction data during a browser session on touchscreen device 110 (e.g., during interactions with e-commerce application 142). In another embodiment, touchscreen device 110 itself can record user-touchscreen interaction data via a client-side application (e.g., interaction handler 135), where the recorded user-touchscreen interaction data is conveyed to the analyzing server upon request. Thus, the user-touchscreen interaction data used to verify user identity may or may not include information captured outside of the e-commerce session interactions.

Thus, in one embodiment (where JAVASCRIPT code captures the user-touchscreen interaction data), no modification of a user Web browser 136 or other software 130 on touchscreen device 110 is needed. In another embodiment, a plugin to an existing e-commerce client app can be required to capture the user-touchscreen interaction data on touchscreen device 110 and transmit the user-touchscreen interaction data 108 from touchscreen device 110 to the analyzing server.

The following are specific examples of how user-touchscreen interactions 108 can be unique from one user to the other. The examples are intended for illustrative purposes and are in no way intended to be limiting. Other user-touchscreen interactions are contemplated.

One measure of user-touchscreen interactions 108 that can be utilized to maintain unique user-touchscreen interaction profiles can be a user's preferred screen orientation. Nowadays, popular mobile devices often support screen orientation changes (via orientation sensor 126 and orientation handler 133), such that if you rotate the device, the content display changes orientation as well. User preference as well as web site or application design can dictate when and how often the user changes orientation. Incoming interaction server 150 can track which sections of the web site or application content the user preferred to view on touchscreen device 110 in landscape or portrait orientation mode, as well as the number of orientation changes during a session and speed of orientation change. For example, in one embodiment, an orientation handler 133 running on the client touchscreen device 110 can detect and record the orientation of the device as a user interacts with the Web site. This orientation information can be conveyed from device 110 to the interaction server 150 over network 105 (or to a storage device that server 150 is able to access).

In different embodiments, touch-screen interactive data, such as the orientation data, can be pushed from the client touchscreen device 110 (i.e., when additional authentication is needed to access function of e-commerce application 142, code from the e-commerce application executing in the browser 136 can trigger orientation handler 133 to convey orientation data to the server 150, for example) or pulled from device 110 (i.e., an application program interface or other standardized interfacing mechanism can be established for enabling server 150 to pull touch-screen interaction data like orientation data from the orientation handler 133 of device 110 or from a memory space of device 110 where this interaction data is exposed to the server 150). Specifics of the conveyance of the orientation data (or any of the user-touchscreen interaction data) from client touchscreen device 110 to the interaction server 150 can vary from implementation to implementation, and the scope of the disclosure is not to be limited in this regard.

Another measure of user-touchscreen interactions 108 that can significantly differ from user to user and depend on the exact device the user is interacting with at the time can be typing on a touchscreen. More specifically, touchscreen devices can provide a different interaction with keyboards than traditional computers, especially when considering that virtual touchscreen keyboards vary with available screen size and orientation for layouts. Depending on device size and orientation, the user can type with 1, 2 or 10 fingers. For example, with smaller devices, some individuals can use a single finger, while others use two. In one embodiment, in addition to the number of fingers used for typing, server 150 can also identify the primary or common finger(s) used for typing (whether it be a user's thumb, index finger, and the like) based on the finger input width. This touchscreen interaction data can be conveyed over network 105 between device 110 and server 150, such as through a push or pull methodology.

Detection of number of fingers can be achieved by interaction handler 135 by sending each keystroke and calculating the time between keys that are far apart, as defined by configurable parameters of the interaction handler 135. For example, when at least four keys intervene between a set of keys, that set of keys can be considered far apart in one embodiment. Different thresholds can be established for vertical, horizontal, and diagonal distances between keys, in one embodiment, for purposes of determining whether keys are far apart as part of a keystroke timing computation. After being captured by handler 135, this interaction data can be conveyed over network 105 to server 150.

Another method, key sliding, may also be used to identify and/or to verify an identity of a user. For example, key sliding data can be captured and/or processed by interaction handler 135, which can convey this key sliding data over network 105, which it is further processed by server 150. Key sliding is an interaction in which a user can use two fingers and slide one finger to the next letter before releasing the previous letter being typed by the other finger. In one embodiment, this can be measured by looking at the rate of incoming letters, where either the interaction handler 135 or server 150 can perform the measurement calculations given raw data captured from user input. This method can also extend to the nowadays popular text input method of SWYPE™ in which a user can use a single finger and slide it across the keyboard, hitting the letters that make up the word he or she wishes to type in the order that they appear in the desired word.

Yet another measure of user-touchscreen interactions 108 can relate to how a user zooms in or out of displayed content. Zooming in and out of displayed content such as web pages and photos can be done in a variety of ways. One user can prefer to place two fingers on the screen and spread them farther apart or bring them closer together, a gesture known as "pinching". Another user can generally utilize changing the screen orientation from landscape to portrait in order to zoom. Yet another user can choose to utilize a zoom button in a dedicated portion of the user interface 134 to zoom in or out. Another option for zooming can be to double tap the touchscreen display 125.

In another embodiment, the direction of zoom interaction when appropriate (for example, while "pinching") can be recorded by interaction handler 135 and transmitted to the interaction server 150. Some users can commonly use a diagonal gesture while others can opt for an up/down gesture relative to the screen orientation. As mentioned previously, the common fingers used, based on width (for example, thumbs vs. other fingers) can also be used by server 150 to identify a user's interaction style, in this case particularly his or her zooming style.

A user's technique for scrolling across content on touchscreen device 110 can also serve as a measure of user-touchscreen interactions 108. For example, the finger position when scrolling can be detected by interaction handler 135, conveyed as data over the network 105, and used by interaction server 150 to identify the user. More specifically, the authentication system (e.g., data from handler 135 and further processed by server 150) can detect if the user commonly scrolls using a single finger or two fingers, and whether or not the finger(s) are placed on the side of the screen or the middle during scrolling gestures.

The speed at which a user scrolls can also be used as part of the identification process. That is, the speed can be detected by interaction handler 135, conveyed across network 105, and can be further processed by interaction server 150. The tendency to over scroll and "bounce" the screen can likewise be detected by interaction server 150. Lastly, the finger used, which can also identify the hand preference, can also be used.

For example, a large impression on the touchscreen (as determined by previously configured threshold values maintained by handler 135) can be detected by handler 135. Handler 135 can also determine that the impression is on the left hand side of the touchscreen display 135. This data (either raw or processed by handler 135) can be conveyed over network 105 to the interaction server 150. The interaction server 150 can further process the received data. During this processing, the interaction server 150 can determine from the impression data that the user prefers to hold touchscreen device 110 with his or her left hand and to scroll with his or her left hand's thumb. Other finger/hand combinations can likewise be discerned, by server 150 using data conveyed from handler 135.

A seemingly more simple, but not in the least less useful, method for discerning user-touchscreen interactions 108 can also be a user's textbox submit preference. The user's textbox submit preference can concern how a user selects to submit information he or she has typed into a textbox. The user can decide to press the enter key on the on-screen keyboard or use an integrated "mouse" (or hardware button the touchscreen device) to navigate to and press a graphical submit button. This information can be again be gathered by interaction handler 135, conveyed over the network 105 to server 150, where server 150 further processes the received data to infer the user's textbox submit preference from the user interaction data. This method can serve as a unique user-touchscreen interaction, especially when considering that submit preferences can be governed by hardware capabilities or limitations of touchscreen device 110.

The aforementioned methods of measuring user-touchscreen interactions 108 that can be utilized to complete a user-touchscreen interaction profile (the record 172 of which can be stored in user-touchscreen interaction database 170) is not intended to be limiting. Other user-touchscreen interactions 108 are contemplated. In one embodiment, the user-touchscreen interaction data can be captured and recorded by interaction handler 135, conveyed over network 105, and received by interaction server 150, which processes this interaction data and records it within database 170.

Client touchscreen computing device 110 can be a personal computer, a notebook computer, a netbook, a tablet, a smart phone, a kiosk, a digital home appliance, an embedded system, an entertainment console, or the like. Touchscreen device 110 can be a general purpose computing device able to have its functionality modified by updating or changing installed applications, can be a special purpose computing device designed for a specific set of functionality that is not user modifiable (or minimally so, such as through a firmware upgrade), or can be a device with an intermediate level of user modifiability (i.e., plug-ins or apps can be installed by a user who is otherwise not able to modify core functionality of the device).

Touchscreen device 110 can include hardware 120 and software 130. The software can be stored on storage device 127 for execution by processor 122 via memory 123.

Memory 123 and storage device 127 can each be a computer-readable tangible storage device. Memory 123 can be a volatile or nonvolatile storage space for containing digitally encoded data. Hardware 120 can also include a bus 124, which communicatively links device 110 components, such as processor 122, memory 123, touchscreen display 125, orientation sensor 126, and storage device 127 to each other. Other components (not shown) are contemplated.

Touchscreen display 125 can be an electronic visual display that can detect the presence and location of a touch within the display area. The term "touchscreen display" can generally refer to a display screen that detects a user touching the display of the device with a finger or hand. While touchscreen display 125 can also sense other passive objects, such as a stylus, the primary purpose of touchscreen display 125 can be to present a surface to display applications and allow for direct interaction without any other hardware (e.g., keyboard, mouse, etc.) between the user and content.

Touchscreen display 125 can be attached to touchscreen device 110, or to a terminal participating on network 105. Touchscreen device 125 can alternatively be attached to a device such as a digital appliance, a navigation device, a video game device, an all-in-one computer, a tablet computer, or a smartphone. There are a variety of touchscreen technologies, including but not limited to, resistive, surface acoustic wave, capacitive, infrared, optical imaging, dispersive signal technology, and acoustic pulse recognition. Regardless of the variety of technologies, the key goals of touchscreen display 125 can be to recognize one or more fingers (to allow for complex gestures using multi-touch) touching display 125, to interpret the command (or user-touchscreen interaction 108) that the touching of display 125 represents, and to communicate the command to the appropriate application.

Orientation sensor 126 can, along with orientation handler 133, align the touchscreen display content depending on the direction in which touchscreen device 110 is held. For example, content position can be switched between portrait and landscape modes. One example of a common orientation sensor for popular touchscreen devices (such as Android® based phones, IPhones®, tablet devices, and the like) can be, but not limited to, an accelerometer.

Each of the software 130 items can also be referred to as a computer program product. Software 130 can include any set of computer readable instructions able to be stored on memory 123 and able to cause the processor 122 to perform a set of actions. Software 130 can include an operating system 132, orientation handler 133, a user interface 134 and interaction handler 135 executing on top of operating system 132, firmware, or the like.

Orientation handler 133 can, in conjunction with its hardware counterpart orientation sensor 126, initiate and record orientation changes of content displayed on the touchscreen display 125. User interface 134 can interact with e-commerce application 142 to correctly format application content and present text boxes, keyboard overlays, graphical selection buttons, and the like. Interaction handler 135 can recognize one or more fingers (to allow for complex gestures using multi-touch) touching display 125, can interpret the command (or user-touchscreen interaction 108) that this represents, and communicate the command to the appropriate application. Web browser 136 or, in another embodiment alternatively a specialized application handler, can be called upon by the user to display content of or launch e-commerce application 142.

Application server 140 can be a server computer or server software dedicated to running particular software applications such as e-commerce application 142, business applications, or databases. Application server 140 can include a set of server components 146, which includes hardware 180 and software/firmware 187. Application server 140 can have built-in redundancy, high performance, and support for complex database access. Application server 140 can include e-commerce application 142 and pattern matching requester 144. E-commerce application 142 (which can include one or more back-end applications, such as for inventory, billing, accounting, etc.) can be any application that can be used to provide services, content, or information to a user at touchscreen device 110, including applications that facilitate purchase of goods or services by users or access to information by users. Pattern matching requester 144 can transmit requests to pattern matching server 160 for a pattern matching score via network 105 and can receive pattern matching scores from pattern matching server 160. Pattern matching requester 144 can also, in conjunction with e-commerce application 142, analyze the pattern matching score to determine an appropriate course of action to handle a user request for an action.

E-commerce application 142 can, for example, allow the action, deny the action, mark the transaction for later follow-up, flag the transaction as one that cannot complete until further verification, request additional authentication information, etc. The user request for an action can include requesting completion of tasks such as an e-commerce transaction, accessing restricted information, modifying user information, or changing a password for the user. Pattern matching requester 144 can be a separate module from e-commerce application 142 or can be integrated into e-commerce application 142. A separate pattern matching requester can potentially serve multiple e-commerce applications, which may or may not include e-commerce application 142.

Incoming interaction server 150 can accept the transmitted user-touchscreen interaction data from client 110 and can interact with user-touchscreen interaction database 170. Interaction server 150 can include a set of server components 156, which includes hardware 180 and software/firmware 187. Incoming interaction server 150 can generate or augment a specific user-touchscreen interaction profile with the received interaction data. The specific user-touchscreen interaction profile can be stored in user-touchscreen interaction database 170. It should be noted that, as mentioned previously, a single user can have multiple unique user-touchscreen interaction profiles. Unique interaction profiles can be necessary when a user utilizes various touchscreen devices. For each touchscreen device, such as touchscreen 110, the user can have a different user-touchscreen interaction pattern. User-touchscreen interactions 108 can be affected by hardware and software components of touchscreen device 110 as well as physical hardware (e.g., size of the screen as compared to the device, type of touchscreen device technology, and the like). As such, incoming interaction server 150 can support mapping of user-browser interaction data for each of the user's common hardware devices.

Interaction data manager 152 of the incoming interaction server 150 can associate user-browser interaction data with a particular user login for later access and analysis. Additionally, interaction data manager 152 can associate received data with a particular profile for the user. A user-touchscreen interaction profile for a user can indicate interaction tendencies that are specific to a particular piece of interaction hardware. Hence, as previously discussed, a user can have multiple user-touchscreen interaction profiles each representing, for example, a different client touchscreen device that he or she can use to access e-commerce application 142. A user can interact differently with a touchscreen-fitted home computing device instead of a mobile phone touchscreen device; this can be, for example, necessitated by one of the touchscreen devices not having a hardware user interface with a scroll wheel or scroll pad.

A user's style can change along with interaction hardware, such as because different options are available, different components have different performances, or for psychological reasons. The differences in hardware can be enough to produce an entirely different user-interaction experience. As each user will likely only have one account at, e.g., a website for accessing e-commerce application 142, multiple user-touchscreen interaction profiles for a particular login provide flexibility to accommodate different user-touchscreen interaction scenarios. Incoming interaction server 150, with interaction data manager 152, can effectively 'map' the user's interaction to the appropriate touchscreen device.

It should be noted that some of the information used to identify the interaction hardware can be maintained by device 110 and/or by server 150. This information can include but is not limited to cookies, IP address subnet, browser code name, browser full name, browser major version, browser minor version, CPU class, platform, user agent, and system language. These items can have varying weights. The weights can be assigned by the incoming interaction server 150 or by the interaction handler 135 depending on implementation choices. Administrators of the e-commerce server 140 and/or the interaction server 150 can be permitted to adjust these weights in one embodiment. Some of the items can, for example, only have a positive weighting associated with them (e.g., IP address subnet). One embodiment of possible components and operations of incoming interaction server 150 will be discussed in greater detail in FIGS. 2 and 4.

Pattern matching server 160 can analyze user-touchscreen interaction patterns and can include interaction data analyzer 162. Pattern matching server 160 can include a set of server components 166, which includes hardware 180 and software/firmware 187. When requested, pattern matching server 160 can compare the current session's user-touchscreen interaction data, as established by the incoming interaction server 150, to previous sessions' stored data 172, maintained in a user-touchscreen interaction database 170. The comparison can result in that the interaction data analyzer 162 determines a unique pattern matching score. Pattern matching server 160 can thus, with a certain probability based on a determined pattern matching score, establish whether or not the person interacting with client touchscreen device 110 is in fact the user whose account is being accessed during the current session. It should be noted that an embodiment of possible components and operations of pattern matching server 160 will be discussed in greater detail in FIGS. 3 and 5.

Each of the server components 146, 156, 166 can include one or more processors 182, one or more computer-readable memories 182, one or more computer-readable, tangible storage devices 185, which are connected via a bus 184. Within each of the servers 140, 150, and 160, program instructions (e.g., software/firmware 187) can be stored on the one or more storage devices 185 for execution by the one or more processors 182 via the one or more memories 183. Software/firmware 187 can include any one or more of e-commerce application 142, pattern matching requester 144, interaction data manager 152, and interaction data analyzer 162, as well as a session data listener 212 (see FIG. 2), an interaction database interface 214 (see FIG. 2), an application server interface 312 (see FIG. 3), and an interaction database interface 314 (see FIG. 3).

User-touchscreen interaction database 170 can maintain records 172 of unique user-touchscreen interaction patterns or profiles associated with specific user touchscreen devices such as touchscreen device 110. Database 170 can represent data stores able to be implemented within any type of hardware including, but not limited to, a magnetic disk, an optical disk, a semiconductor memory, a digitally encoded plastic memory, a holographic memory, or any other recording medium. Database 170 can be a stand-alone storage unit as well as a storage unit formed from a plurality of physical devices. Additionally, information can be stored within database 170 in a variety of manners. For example, information can be stored within a database structure or can be stored within one or more files of a file storage system, where each file may or may not be indexed for information searching purposes. Further, database 170 can utilize one or more encryption mechanisms to protect stored information from unauthorized access.

Network 105 can include any hardware/software/and firmware necessary to convey data encoded within carrier waves. Data can be contained within analog or digital signals and conveyed though data or voice channels. Network 105 can include local components and data pathways necessary for communications to be exchanged among computing device components and between integrated device components and peripheral devices. Network 105 can also include network equipment, such as routers, data lines, hubs, and intermediary servers which together form a data network, such as the Internet. Network 105 can also include circuit-based communication components and mobile communication components, such as telephony switches, modems, cellular communication towers, and the like. Network 105 can include line based and/or wireless communication pathways.

Figure 2:
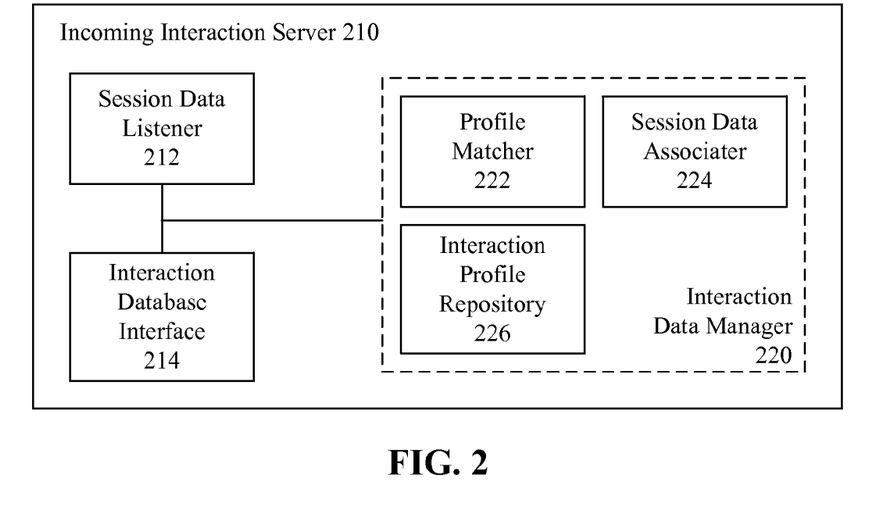
FIG. 2 is a schematic diagram of an incoming interaction server for e-commerce transaction user authentication using user-touchscreen interaction analysis in accordance with embodiments of the inventive arrangements disclosed herein.

FIG. 2 is a schematic diagram of an incoming interaction server 210 for e-commerce transaction user authentication using user-touchscreen interaction analysis in accordance with embodiments of the inventive arrangements disclosed herein. Incoming interaction server 210 is an example of incoming interaction server 150 depicted in FIG. 1. Incoming interaction server 210 can receive user-touchscreen interaction data from one or more client touchscreen devices, such as touchscreen device 110, and process and store the received data. The incoming interaction server 210 can include an interaction data manager 220 (which is an example of interaction data manager 152 depicted in FIG. 1 and can further include a profile matcher 222, a session data associater 224 and an interaction profile repository 226), a session data listener 212, and an interaction database interface 214.

Session data listener 212 can receive indications of user-touchscreen interactions 108 in the form of user-touchscreen interaction data from client touchscreen device 110 via network 105. The session data listener 212 can then transmit the received data to the interaction data manager 220 for processing. Interaction database interface 214 can store user-touchscreen interaction data records 172 or other information in the user-touchscreen interaction database 170 for incoming interaction server 210 and can serve as the interface between user-touchscreen interaction database 170 and incoming interaction server 150.

Interaction data manager 220 can process received user-touchscreen interaction data and associate the data with a user and/or profile, and can, as previously discussed, use session data associater 224, profile matcher 222, and interaction profile repository 226 to assist it in performing its tasks. Session data associater 224 can associate received user-touchscreen interaction data (from a particular session) with a particular user login. User names, logins, or other information can, in some embodiments, be contained as part of the user-touchscreen interaction data so that the session data associater 224 may extract user login information from the received data. Profile matcher 222 can provide additional fidelity in that it can further associate, or match, the received user-touchscreen interaction data with a particular user-touchscreen interaction profile record 172 maintained in user-touchscreen interaction database 170.

User-touchscreen interaction profiles can, in one embodiment, also be stored in interaction profile repository 226. Each user-touchscreen interaction profile can correspond to a particular piece of hardware (i.e., client touchscreen device 110) that the user can utilize to interact with e-commerce application 142, e.g., via browser 136. As discussed previously, a user-touchscreen interaction profile for a user can indicate interaction tendencies that are specific to a particular piece of interaction hardware, and a user can have multiple user-browser interaction profile records 172, each representing a different touchscreen device that he or she can use to access e-commerce application 142.

Figure 3:
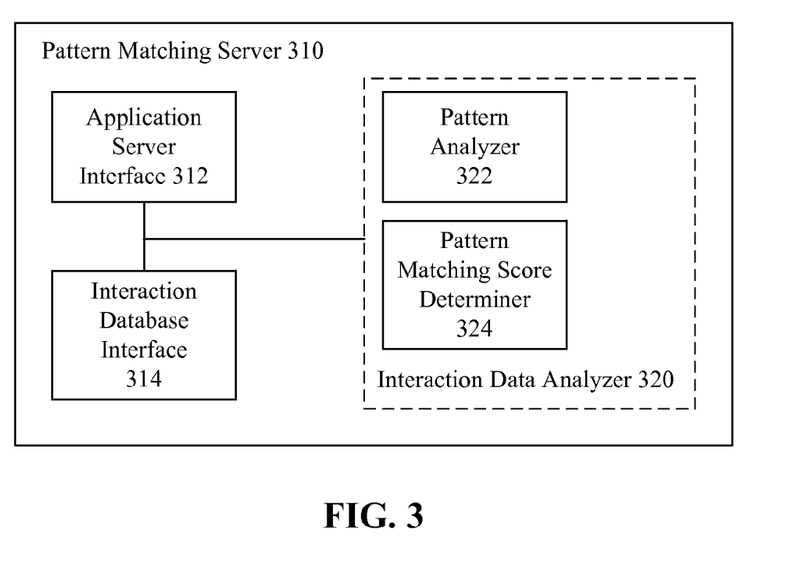
FIG. 3 is a schematic diagram of a pattern matching server for e-commerce transaction user authentication using user-touchscreen interaction analysis in accordance with embodiments of the inventive arrangements disclosed herein.

FIG. 3 is a schematic diagram of a pattern matching server 310 for e-commerce transaction user authentication using user-touchscreen interaction analysis in accordance with embodiments of the inventive arrangements disclosed herein. Pattern matching server 310 is an example of pattern matching server 160 depicted in FIG. 1. Pattern matching server 310 can determine a pattern matching score based on user-touchscreen interactions 108 during the current session and detected patterns in the records 172 for the user that are stored in the user-touchscreen interaction database 170. In one embodiment, pattern matching server 310 can include an interaction data analyzer 320 (which is an example of interaction data analyzer 162 depicted in FIG. 1 and can include a pattern analyzer 322 and a pattern matching score determiner 324), an application server interface 312, and an interaction database interface 314.

Application server interface 312 can receive requests from e-commerce application 142 (via pattern matching requester 144) for a pattern matching score for a session and can pass those requests to interaction data analyzer 320. Application server interface 312 can also receive determined pattern matching scores from interaction data analyzer 320 and can transmit the scores to requesting e-commerce application 142. Interaction database interface 314 can, upon request by interaction data analyzer 320, access records 172 or other information in user-touchscreen interaction database 170 and can serve as the interface between interaction data analyzer 320 and user-touchscreen interaction database 170.

Interaction data analyzer 320 can determine a pattern matching score based on user-touchscreen interactions 108 during the current session and detected patterns in records 172 for the user that are stored in the user-touchscreen interaction database 170. As previously mentioned, in one embodiment, interaction data analyzer 320 can include pattern analyzer 322 and pattern matching score determiner 324 to assist it in performing its tasks. Pattern analyzer 322 can analyze stored user-touchscreen interaction data for a particular user (and optionally profile), such as for interaction patterns (e.g., user tendencies, habits, etc.).

Pattern matching score determiner 324 can, based on the results of the analysis from pattern analyzer 322 and the interactions 108 from the user's current session, determine a pattern matching score for the session. To do so, pattern matching score determiner 324 can compare interaction data from the user's current session with data of user-touchscreen interaction patterns or user-touchscreen interaction profiles to ascertain similarities and differences between them. As discussed previously, the pattern matching score can be any indication of the likelihood that the person (or entity) acting as the user of the current session is in fact the actual user.

Figure 4:
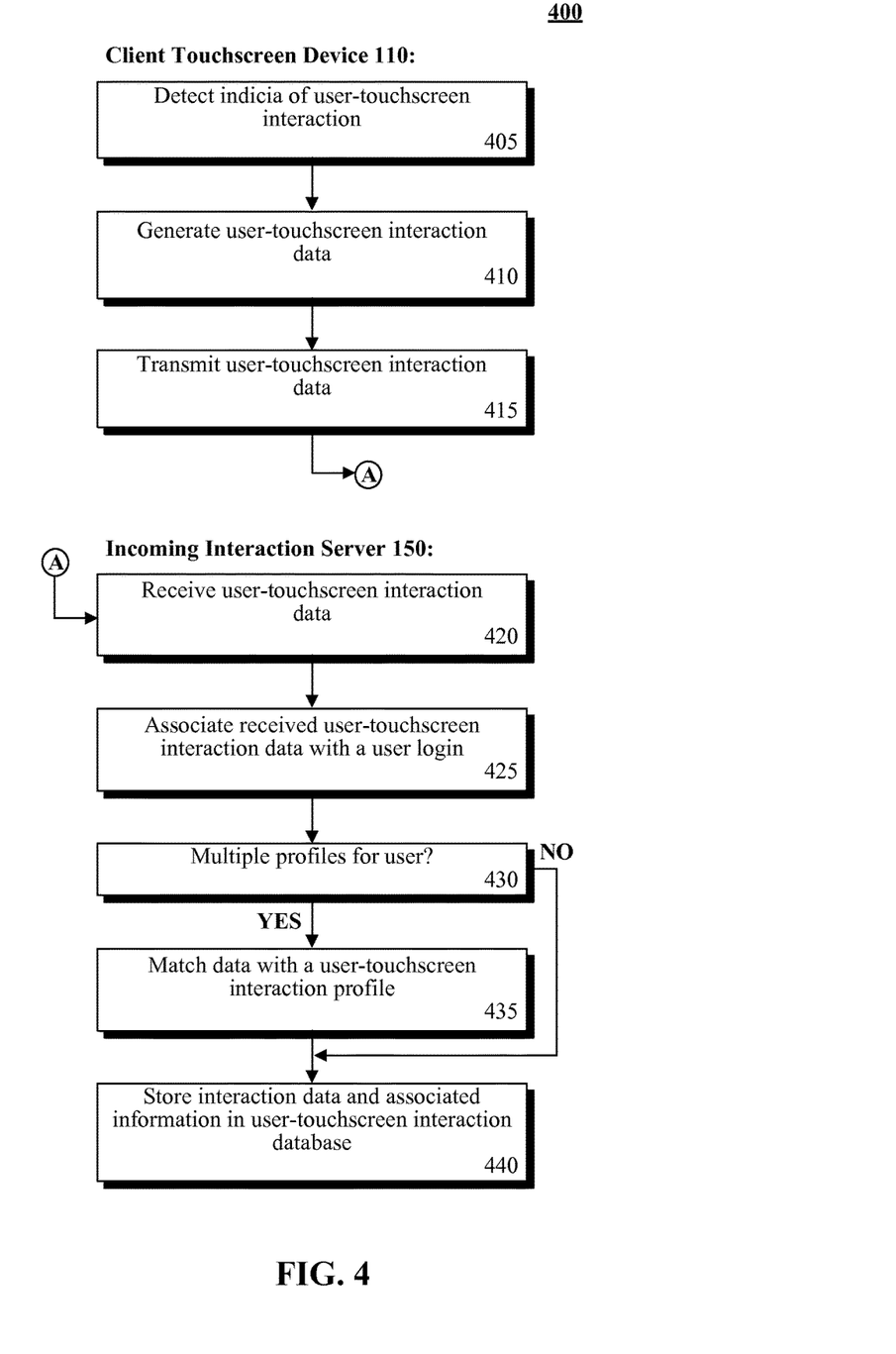
FIG. 4 shows a flow chart of a method for detecting user-touchscreen interactions and processing user-touchscreen interaction data in accordance with embodiments of the inventive arrangements disclosed herein.

FIG. 4 shows a flow chart of a method 400 for detecting user-touchscreen interactions and processing user-touchscreen interaction data in accordance with embodiments of the inventive arrangements disclosed herein. In one embodiment, the method of flow chart 400 can be performed by client touchscreen device 110 and incoming interaction server 150.

In step 405, browser 136 of client touchscreen device 110 (such as via a script running on a displayed webpage), or a local application (or app), can detect indicia of user-touchscreen interactions 108. Step 405 (as well as steps 410 and 415) can execute in browser 136 or in the app in response to a user accessing a webpage or app for e-commerce application 142 that is configured for user-touchscreen interaction-based authentication according to the disclosed embodiments.

In step 410, as indicia of user-touchscreen interactions 108 is gathered, browser 136 or the app can generate user-touchscreen interaction data based on the indicia of step 405 and transmit the generated user-touchscreen interaction data to one or more specified incoming interaction servers, such as incoming interaction server 210. The network location of the one or more incoming interaction servers can be specified in JAVASCRIPT (or other script) executing on browser 136 or on the app. The ability to specify particular incoming interaction servers can facilitate the use of multiple incoming interaction servers in a single e-commerce authentication system 100.

In step 420, the one or more incoming interaction servers can receive user-touchscreen interaction data from one or more client touchscreen devices, such as touchscreen device 110. In step 425, the one or more incoming interaction servers can associate received user-touchscreen interaction data with a particular user login via interaction data manager 220. Indications of the user login can be stored in the user-touchscreen interaction data or received separately. As described previously, in one embodiment, a user can have multiple profiles for his or her user login associated with different client touchscreen devices, which he or she can use to access e-commerce application 142.

At step 430, the one or more incoming interaction servers can determine whether or not multiple profiles for the user exist. If it is determined that there are in fact multiple established profiles for the user, profile matcher 222 can perform optional step 435. In optional step 435, profile matcher 222 can match the received data with a user-touchscreen interaction profile or record 172. As previously mentioned, profile matcher 222 can use, for example, an IP address or other identification to differentiate between different user-touchscreen interaction profiles.

In step 440, interaction database interface 214 can store user-touchscreen interaction data and any associated information in the user-touchscreen interaction database 170, after which the method terminates. Associated information can include, for example, an indication of the user login, user-touchscreen interaction profile or record 172, or other identification information.

Figure 5:
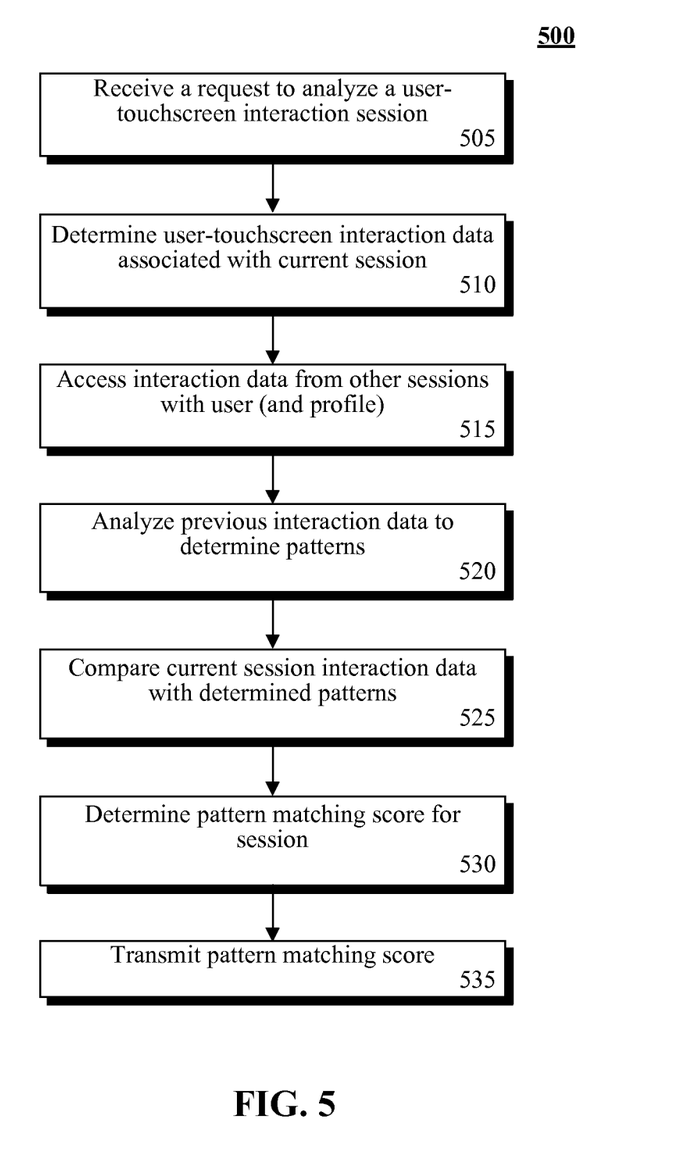
FIG. 5 shows a flow chart of a method for receiving a request to analyze a user-touchscreen interaction session and to determine a pattern matching score in accordance with embodiments of the inventive arrangements disclosed herein.

FIG. 5 shows a flow chart of a method 500 for receiving a request to analyze a user-touchscreen interaction session and to determine a pattern matching score in accordance with embodiments of the inventive arrangements disclosed herein. In one embodiment, the method of flow chart 500 can be performed by components of pattern matching server 310.

At step 505 pattern matching server 310 can receive a request from e-commerce application 142 to analyze a particular user-touchscreen interaction session. In step 510, pattern matching server 310 can determine the user-touchscreen interaction data associated with the current session for which the request was made. In one embodiment, the user-touchscreen interaction data for the current session can be stored in the user-touchscreen interaction database 170. In an alternative embodiment, the user-touchscreen interaction data for the current session can be received from e-commerce application 142 along with the request.

In step 515, pattern matching server 310 can access the user-touchscreen interaction data from other sessions of the user (and optionally for the user's particular profile). The user-touchscreen interaction data from previous sessions can also be stored in user-touchscreen interaction database 170. After accessing the data, pattern matching server 310 can, in step 520, analyze the previous interaction data to determine any patterns in the user-touchscreen interaction data.

In step 525, pattern matching server 310 can then compare the current session user-touchscreen interaction data with the determined patterns to ascertain the similarities and/or differences between the two. In step 530, based on the comparison, pattern matching server 310 can determine the pattern matching score for the current session. The comparison can use one or more factors.

For example, in one embodiment, in a single factor test (based on zooming methods/behavior) can be used. The pattern matching score can be represented as a percentage of correspondence in one embodiment. For example, a pattern matching score of 85 (out of 100) can represent the behavior exhibited during a current session matches the zooming behavior recorded in the user profile. Different types of behavior can have different expected deviations from the baseline profile. For example, an 85 score (representing 85%) can be within acceptable variance levels for zooming behavior, but can be outside acceptable variance levels for typing rate. In another embodiment, pattern matching score can represent a score generated from a set of different behavioral factors. For example, if a pattern matching score is based on hand preference (HandPreferenceScore), pressure asserted on a touch screen (PressureScore), and a space between touchpoints (SpaceScore), a formula can be pattern matching score=HandPreferenceScore+PressureScore+SpaceScore/3. This formula can be modified to weigh one behavioral characteristic (one type of user-touchscreen interaction) over another. The above examples are provided for illustrative purposes only and are not to be construed as a limitation of the formulas or number of factors to be used to compute the pattern matching score.

In step 535, the determined pattern matching score for the current session can be transmitted by to e-commerce application 142, after which the method terminates. By utilizing the method of FIG. 5, pattern matching server 310 can thus provide pattern matching scores to e-commerce application 142 for users currently accessing e-commerce application 142 from their specific client touchscreen device, e.g., touchscreen device 110.

Figure 6:
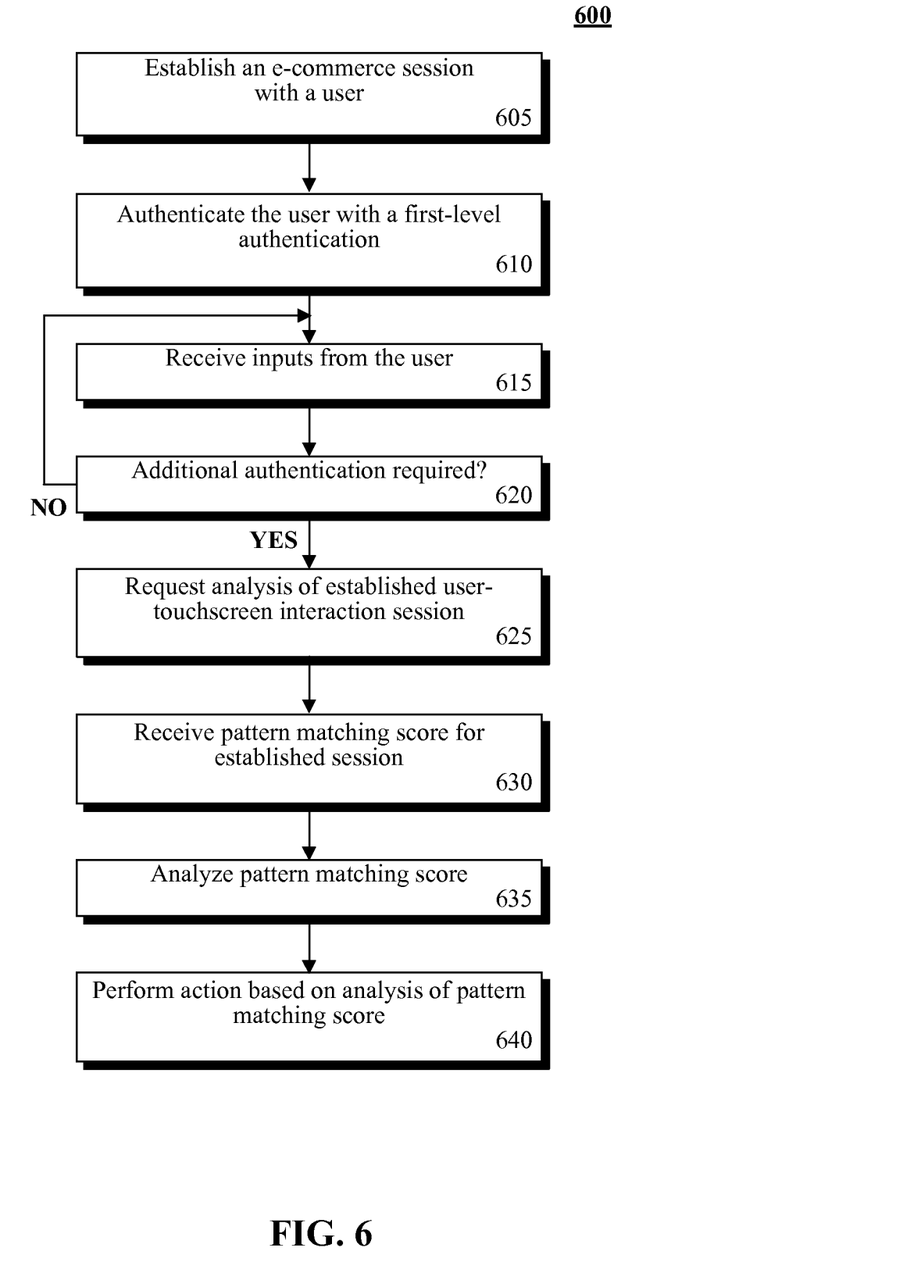
FIG. 6 shows a flow chart of a method for interacting with a user and authenticating the user with a pattern matching score in accordance with embodiments of the inventive arrangements disclosed herein.

FIG. 6 shows a flow chart of a method 600 for interacting with a user and authenticating the user with a pattern matching score in accordance with embodiments of the inventive arrangements disclosed herein. The method of flow chart 600 can, in one embodiment, be performed, by e-commerce application 142 executing on, for example, application server 140. Flow chart 600 can begin at step 605, where e-commerce application 142 can establish an e-commerce session with a user. Establishment of a session can typically include authenticating the user with a first-level authentication at optional step 610. A first-level authentication can be authentication such as a user name and password or any other type of authentication. Alternatively, no first-level authentication can be performed (eliminating the need for element 610) and establishment of a user session can require only a user name or other identification.

Once a session is established, e-commerce application 142 can, in step 615, receive inputs from the user as part of the normal operation of e-commerce application 142. User inputs can include requests for action (e.g., checkout or purchase, request for information, etc.). E-commerce application 142 can, in step 620, determine whether or not additional authentication is required for any action requested by the user. If no additional authentication is required (such as if any first-level authentication is sufficient for the requested action), the method of flow chart 600 can return to step 615 to continue to receive more user inputs.

If, on the other hand, e-commerce application 142 determines that additional authentication is required, pattern matching requester 144 can at step 625 request analysis of the established user-touchscreen interaction session from pattern matching server 160. Pattern matching requester 144 can make such request in response to a request by e-commerce application 142 itself. The request for analysis can include an indication of the user (such as a user login) and can optionally include an indication of user-touchscreen interactions 108 with touchscreen device 110 during the current session. In step 630, after requesting analysis of user-touchscreen interactions 108 for the session in step 625, e-commerce application 142 can receive a pattern matching score for the established session. E-commerce application 142 can then, in step 635, analyze the pattern matching score to determine an appropriate course of action with respect to the user. In step 640, an appropriate action based on the analysis of the pattern matching score can be performed, after which the method terminates.

E-commerce application 142 can determine a course of action based on both the requested action by the user and the analysis of the pattern matching score. For example, if a user has requested to purchase goods or services with a credit card, e-commerce application 142 can request additional authentication before authorizing the purchase. Responsive to receipt of a favorable pattern matching score (i.e., one indicating a high level of authentication), e-commerce application 142 can choose to allow the transaction to proceed. In contrast, responsive to receipt of a less favorable pattern matching score (which can indicate a low authentication strength), e-commerce application 142 can deny the transaction, flag the transaction for later follow-up, request additional information (another form of authentication), request a follow-up phone call, or other action.

As used herein, "favorable", "unfavorable", and "less favorable" as applied to the pattern matching score can refer to whether the pattern matching score meets or exceeds a previously established set of one or more threshold values, or not. Different levels (e.g., different thresholds) for the pattern matching scores can be established in various embodiments. For example, in one embodiment, a pattern matching score of 90 or higher can be considered "favorable", where favorable represents a score sufficient to successfully verify a user's identity. In another example, a pattern matching score of 60 or lower can be considered "unfavorable" or can be sufficiently low to indicate that a user is verified as not being an expected user. A pattern matching score between 60 and 90 can represent a range of uncertainty, where a user may or may not be the expected user, so that further verification actions should be taken to confirm or refute a user's identity. These values are illustrative only, and various contemplated embodiments may only compare a pattern matching score to an upper threshold, may only compare a pattern matching score to a lower threshold, and/or may only compare a pattern matching score to a range—where different actions are associated with different comparison results.

Further, different programmatic actions (e.g., e-commerce actions desired by a user) can have different thresholds established that must be met during a session before the corresponding programmatic action is able to be taken. For example, a payment action for a significant amount (over $500) can require a pattern matching score of 90 or greater, where payment actions of lesser amounts (under $500) can require a pattern matching score of 80 or greater before a user is permitted to perform the action. Additionally, lengthy sessions, or sessions where there is a significant pause in user interactions (e.g., received input) may require a re-verification of that user's identity before a set of one or more actions are permitted for that user.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method for authenticating a user participating in an Internet commerce session through a client touchscreen device in communication with an e-commerce transaction system via an Internet Protocol (IP) network, the method comprising the steps of:
    a computer of the system receiving a request for an e-commerce session related action via the client touchscreen from the user,
    the computer of the system performing a primary authentication chosen from the group consisting of: username-password authentication, security code authentication, PIN (Personal Identification Number) authentication, Credit card or Debit card authentication, call-back authentication and OTP (One Time Password) authentication;
    the computer of the system receiving as part of the requested e-commerce session, user-touchscreen interaction data regarding at least one characteristic of how the user interacted with the touchscreen in the course of the e-commerce session;
    the computer of the system determining, without making user aware of the additional authentication, whether the requested e-commerce session related action requires additional authentication of the user;
    if the requested e-commerce session related action requires additional authentication from the user, the computer of the system analyzing the user touchscreen interaction data to detect behavioral biometrics of the user within the e-commerce session by the steps of:
        locating a user profile associated with the authentication of the user within a database; the user profile comprising interaction data derived from analysis of previous user-touchscreen interactions;
        comparing the received user-touchscreen interactions within the requested e-commerce session to interaction data in the user profile to determine a score; and
        if the score meets or exceeds a determined threshold, verifying authentication of the user and sending permission to the client touchscreen to allow the requested e-commerce session related action.

2. The method of claim 1, wherein the user touchscreen interaction data that the computer compared to the interaction data of the user-touchscreen interaction profile comprises at least one of: screen orientation data, zooming gesture data, and scrolling gesture data for the e-commerce session.

3. The method of claim 1, wherein the user touchscreen interaction data that the computer compared to the interaction data of the user-touchscreen interaction profile comprises at least one of: a number of fingers used when typing on the touch-screen, keysliding behavior for slide-based keyboard interactions on the touch-screen, an amount of pressure asserted on the touch-screen when making selections, a detected touch area per touch on the touch-screen, and a distance between two touch-points on the touchscreen.

4. The method of claim 1, wherein the requested e-commerce session related action is one to complete a purchase of a good or a service via the e-commerce session.

5. The method of claim 1, further comprising the steps of:
    the computer establishing the e-commerce session with the user;
    the computer authenticating the user with a first-level authentication based on a user response to a prompting for user-name and password; and
    the computer determining that the requested e-commerce session related action requires a second-level authentication action that requires the additional authentication than available responsive to the first level authentication.

6. The method of claim 1, further comprising the steps of: the computer receiving a pattern matching score from a pattern matching server.

7. The method of claim 1, wherein the requested action comprises one or more of completion of an e-commerce transaction, access to restricted information, modification of user information, or a change to a password specific to an e-commerce site.

8. The method of claim 1, wherein the computer is a server, wherein the e-commerce session results from the server interacting with an installed application executing on the touch-screen device having the touch-screen, wherein the installed application is an installed application specifically linked to the server within code of the installed application itself.

9. The method of claim 1, wherein the computer is a Web server, wherein the e-commerce session results from the Web server interacting with a Web browser executing upon the touch-screen device, the method further comprising the steps of:
  the Web server receiving an indication that the Web browser is executing on a touchscreen device having the touch-screen; and
  responsive to receiving the indication, the Web server adjusting internal parameters for verifying user identity to utilize touchscreen behavioral biometric patterns.

10. The method of claim 1, wherein the computer is a Web server, wherein the e-commerce session results from the Web server interacting with a Web browser executing upon the touch-screen device, wherein the user touchscreen interaction data that the Web server compared to the interaction data of the user-touchscreen interaction profile comprises screen orientation data for the e-commerce session.

11. The method of claim 1, wherein the computer is a Web server, wherein the e-commerce session results from the Web server interacting with a Web browser executing upon the touch-screen device, wherein the user touchscreen interaction data that the Web server compared to the corresponding data of the user-touchscreen interaction profile comprises zooming gesture data for the e-commerce session.

12. The method of claim 1, wherein the computer is a Web server, wherein the e-commerce session results from the Web server interacting with a Web browser executing upon the touch-screen device, wherein the user touchscreen interaction data that the Web server compared to the corresponding data of the user-touchscreen interaction profile comprises scrolling gesture data for the e-commerce session.

13. An apparatus for authenticating a user participating in an Internet commerce session through a client touchscreen device in communication with an e-commerce transaction system via an Internet Protocol (IP) network, the apparatus comprising:
  one or more computer-readable non-transitory storage devices;
  computer usable program code, stored on at least one of the one or more non-transitory storage devices, wherein execution of the stored computer usable program code by a process causes the processor or a device within which the processor is operational to receive a request for an e-commerce session related action via the client touchscreen;
  computer usable program code, stored on at least one of the one or more non-transitory storage devices, wherein execution of the stored computer usable program code by a process causes the processor or a device within which the processor is operational to perform a primary authentication chosen from the group consisting of: username-password authentication, security code authentication, PIN (Personal Identification Number) authentication, Credit card or Debit card authentication, call-back authentication and OTP (One Time Password) authentication;
  computer usable program code, stored on at least one of the one or more non-transitory storage devices, wherein execution of the stored computer usable program code by a process causes the processor or a device within which the processor is operational to receive as part of the requested e-commerce session, user-touchscreen interaction data regarding at least one characteristic of how the user interacted with the touchscreen in the course of the e-commerce session;
  computer usable program code, stored on at least one of the one or more non-transitory storage devices, wherein execution of the stored computer usable program code by a process causes the processor or a device within which the processor is operational to determine without making user aware of the additional authentication whether the requested e-commerce session related action requires additional authentication of the user;
  computer usable program code, stored on at least one of the one or more non-transitory storage devices, wherein execution of the stored computer usable program code by a process causes the processor or a device within which the processor is operational to, if the requested e-commerce session related action requires additional authentication from the user, analyzing the user-touchscreen interaction data to detect behavioral biometrics of the user within the e-commerce session by:
    locating a user profile associated with the authentication of the user within a database; the user profile comprising interaction data derived from analysis of previous user-touchscreen interactions;
    comparing the received user-touchscreen interactions within the requested e-commerce session to interaction data in the user profile to determine a score; and
  if the score meets or exceeds a determined threshold, verifying authentication of the user and sending permission to the client touchscreen to allow the requested e-commerce session related action.

14. The apparatus of claim 13, wherein the user touchscreen interaction data compared to the interaction data of the user-touchscreen interaction profile comprises at least one of: screen orientation data, zooming gesture data, and scrolling gesture data for the e-commerce session.

15. The apparatus of claim 13, wherein the user touchscreen interaction data compared to the interaction data of the user-touchscreen interaction profile comprises at least one of: a number of fingers used when typing on the touch-screen, keysliding behavior for slide-based keyboard interactions on the touch-screen, an amount of pressure asserted on the touch-screen when making selections, a detected touch area per touch on the touch-screen, and a distance between two touch-points on the touchscreen.

16. The apparatus of claim 13, wherein the e-commerce session is an interactive session between a Web server and a Web browser executing upon the touch-screen device.

17. The apparatus of claim 16, wherein the user touchscreen interaction data compared to the interaction data of the user-touchscreen interaction profile comprises screen orientation data, zooming gesture data, or scrolling gesture data for the e-commerce session.

18. A computer system for authenticating a user participating in an Internet commerce session through a client touchscreen device in communication with an e-commerce transaction system via an Internet Protocol (IP) network, the computer system comprising:
  one or more processors, one or more computer-readable memories and one or more computer-readable tangible storage devices;
  program instructions, stored on at least one of the one or more storage devices for execution by at least one of the one or more processors via at least one of the one or more memories, to receive a request for an e-commerce session related action via the client touchscreen from the user;

program instructions, stored on at least one of the one or more storage devices for execution by at least one of the one or more processors via at least one of the one or more memories, to perform a primary authentication chosen from the group consisting of: username-password authentication, security code authentication, PIN (Personal Identification Number) authentication, Credit card or Debit card authentication, call-back authentication and OTP (One Time Password) authentication;

program instructions, stored on at least one of the one or more storage devices for execution by at least one of the one or more processors via at least one of the one or more memories, to receive as part of the requested e-commerce session, user-touchscreen interaction data regarding at least one characteristic of how the user interacted with the touchscreen in the course of the e-commerce session;

program instructions, stored on at least one of the one or more storage devices for execution by at least one of the one or more processors via at least one of the one or more memories, to determine, without making user aware of the additional authentication, whether the requested e-commerce session related action requires additional authentication of the user;

if the requested e-commerce session related action requires additional authentication from the user, the computer of the system analyzing the user touchscreen interaction data to detect behavioral biometrics of the user within the e-commerce session by the program instructions of:

locating a user profile associated with the authentication of the user within a database; the user profile comprising interaction data derived from analysis of previous user-touchscreen interactions;

comparing the received user-touchscreen interactions within the requested e-commerce session to interaction data in the user profile to determine a score; and if the score meets or exceeds a determined threshold, verifying authentication of the user and sending permission to the client touchscreen to allow the requested e-commerce session related action.

19. The computer system of claim 18, wherein the user touchscreen interaction data compared to the interaction data of the user-touchscreen interaction profile comprises at least one of: a number of fingers used when typing on the touch-screen, keysliding behavior for slide-based keyboard interactions on the touch-screen, an amount of pressure asserted on the touch-screen when making selections, a detected touch area per touch on the touch-screen, and a distance between two touch-points on the touchscreen.

20. The computer system of claim 18, wherein the e-commerce session is an interactive session between a Web server and a Web browser executing upon the touch-screen device, and wherein the user touchscreen interaction data compared to the interaction data of the user-touchscreen interaction profile comprises screen orientation data, zooming gesture data, or scrolling gesture data for the e-commerce session.

* * * * *